March 14, 1961 A. B. HURLEY 2,974,566
MULTI-SECTION MOTION PICTURE PROJECTION SCREEN
Filed Nov. 15, 1957 2 Sheets-Sheet 1
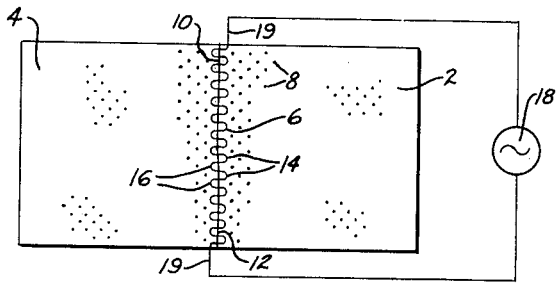
FIG.1
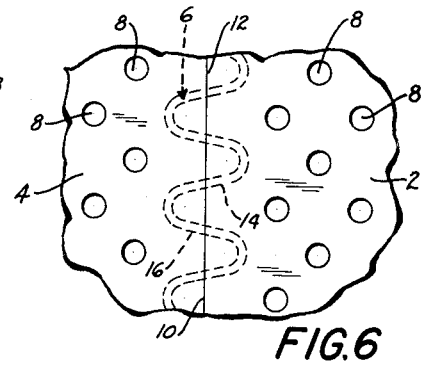
FIG.6
FIG.2
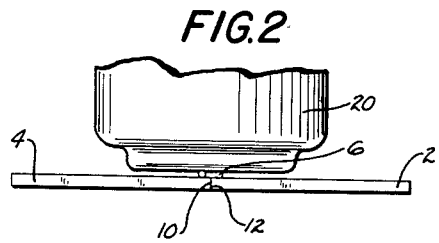
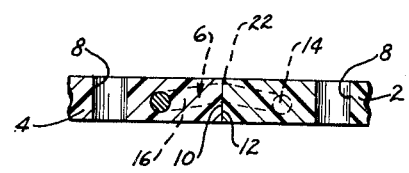
FIG.7
FIG.3
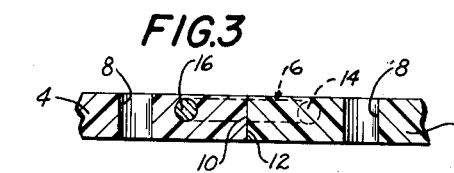
FIG.8
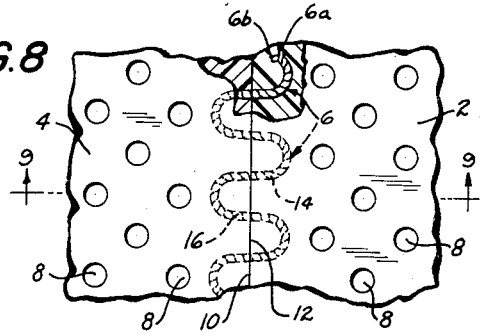
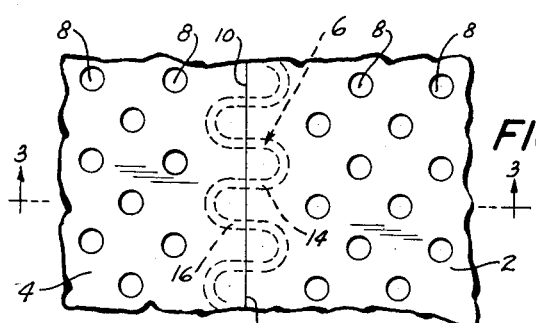
FIG.4
FIG.9
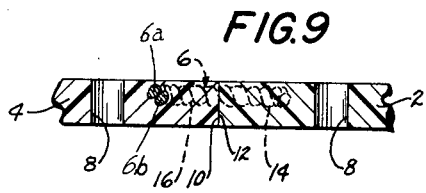
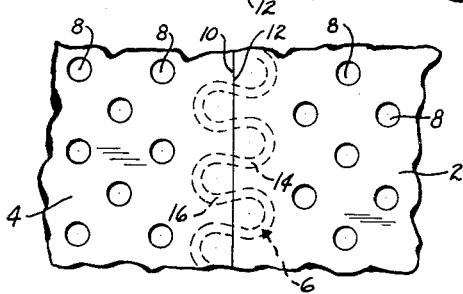
FIG.5
INVENTOR
ALBERT B. HURLEY
BY
James and Franklin
ATTORNEYS March 14, 1961  A. B. HURLEY  2,974,566
MULTI-SECTION MOTION PICTURE PROJECTION SCREEN
Filed Nov. 15, 1957  2 Sheets-Sheet 2

INVENTOR.
ALBERT B. HURLEY
BY
James and Franklin
ATTORNEYS

United States Patent Office 2,974,566
Patented Mar. 14, 1961

2,974,566
MULTI-SECTION MOTION PICTURE PROJECTION SCREEN

Albert B. Hurley, Huntington, N.Y.; Sarah F. Hurley, administratrix of said Albert B. Hurley, deceased, assignor to Hurley Screen Company, Inc., Corona, N.Y., a corporation of New York Filed Nov. 15, 1957, Ser. No. 696,874

21 Claims. (Cl. 88—28.9)

This invention relates to a novel construction for a motion picture projection screen, and particularly to the means employed for joining the individual sections of which such a screen is made.

Present day motion picture projection screens are generally formed of a plurality of joined sheets of material, the surfaces of those sheets exposed to the light from the motion picture projector being variously constituted in order to have desired reflective characteristics. Such screens may be classified into four main groups according to the nature of their reflecting surfaces as follows:

(1) Matte white screens have highly reflective white pigments (generally titanium dioxide) incorporated in the surface, or in the case of unsupported films, throughout the entire body. The surface is generally of a diffuse nature and reflects light uniformly in all directions.

(2) Plain metallic screens are usually coated with highly reflective materials, such as aluminum powder, and the use of various particle sizes controls brightness. However, reflection is uniform and covers narrow angles. It should be noted that the term "metallic" applies to the surface coating, and not to the material of the sheets themselves.

(3) Beaded screens have small spherical glass beads embedded in the surface which act as optical lenses and characteristically reflect light back to the source. The reflected pattern is uniform and covers narrow angles.

(4) Lenticular screens are constructed like the plain metallic screens except that small optical elements are embossed into or otherwise imparted to the reflective surface. By controlling the size and curvature of the optical elements very precise control can be maintained, such as an asymmetrical reflection pattern redirecting the reflected light into any desired viewing area.

In all of these screens the sheets themselves are usually formed of suitable plastic material, generally thermoplastic in nature, and ordinarily of a thickness of about .015 to .025 inch. The size of the completed screens as employed in motion picture theatres is, on the average, fourteen feet high and nineteen feet wide, the largest of these commercial screens being forty feet high and eighty feet wide and the smallest about nine feet high and twelve feet wide. Plastic sheeting is commercially obtainable with a maximum width of five feet. Consequently, in order to make a motion picture screen of such sheets, at least three of them, and in some cases sixteen of them, must be joined with their edges in abutting relation. These screens, once formed, are bound, grommeted and laced into a frame so that the reflecting surface presents a plane surface to the projected light, and any seams or joints that are noticeable to the eye cannot be tolerated, since they would distort the image which the screen would project.

Furthermore, when the screen is laced into its frame, much tension is applied thereto in order to ensure that its reflecting surface is planar. The line of stress through the thin screen tends to pass through its center and when this line of stress approaches the butt-edge joint it tends to pass through the center of the total thickness. The conventional method heretofore employed to accomplish the butt-edge joint is to use a splicing strip of appreciable width which overlaps the rear surfaces of the abutting sheets and is secured by adhesive to the entire overlapped surfaces thereof. The sealing strip thus becomes, in effect, an integral part of the screen proper. Consequently when such a screen is stressed the line of stress travels over into the splice and that part of the screen surface is caused to move out of its plane, causing unequal and distorted reflection which is particularly noticeable and objectionable. This defect has been suffered up to the present time because it was considered unavoidable.

Should an overlapping joint be employed, it would be objectionable for the same reason, regardless of the application of stress, and consequently such a method of joining is not practical.

An additional drawback to the sealing strip arrangement is that the strip must be of appreciable width if it is to provide the proper joint strength, and hence will obstruct many of the sound-transmitting perforations in the screen, those perforations being provided in rows spaced approximately $\frac{3}{32}$ inch from one another over the entire surface of the screen.

Moreover, the joints between the sheets must be of appreciable strength and permanency. The tension which is applied to the screen when it is laced into its frame will tend to separate the sheets at their joint. Any such separation would cause a very noticeable line in the reflected picture, and would require replacement of the entire screen.

In accordance with the present invention, however, means are provided for taking advantage of the thermoplastic nature of the material of which the individual sheets are formed so as to produce a firm and reliable joint between adjacent sheets. The strength of this joint is at least equal to that of the conventional methods previously employed for this purpose and is in some instances of even greater strength. The arrangement of the present invention either adds no thickness whatsoever to the joined sheets at their joint or else does so in such a way that when tension is applied thereto no appreciable bulging or buckling at the joint takes place. The reflective surfaces of the sheet adjacent the joint are entirely unmarred, even when the screens are of the beaded or lenticular types, and their sound-transmissive properties are unimpaired. Joints produced according to the present invention have proved to be entirely invisible under projected light, are often undistinguishable even upon close inspection, and will reliably retain these characteristics under normal conditions of use.

The sheets to be joined together are positioned with opposing edges thereof closely adjacent one another. These sheets have the physical property of softening or melting when heat is applied thereto. For the sake of convenience, I shall in this specification and in the claims which form a part thereof employ the term "heat-softenable" to denote materials possessing this physical property. A filamentary element of comparatively high tensile strength, such as a metal wire, is placed on the non-reflective surfaces of the sheets so as to extend from one sheet to another across the opposed edges. It is preferred that this element be in the form of a continuous filament bent in zig-zag fashion so as to extend along the opposed edges and to cross and recross those edges a large number of times along the lengths thereof. Heat is applied to the areas of the sheets directly beneath the filamentary element, as by passing an electric current through that element when it is in the form of a conductive wire, and simultaneously with the application of heat pressure is applied to the element so as to embed it into the heat-softened sheet. This entire procedure may be carried out in less time than it takes to describe it. The filamentary element has a thickness appreciably less than the thickness of the sheets, and preferably on the order of one-half the thickness of the sheets, and in one preferred embodiment is substantially completely embedded in the sheets. The result is that the filamentary element defines a very firm bond between the sheets without in any way distorting or changing the appearance of the reflective surfaces of the sheets or adding any thickness to the sheets at their joined areas. Alternatively the filamentary element is only partially embedded in the sheets, and a narrow auxiliary strip is then placed atop the filamentary element, the latter then being embedded in the auxiliary strip as well, the auxiliary strip preferably being otherwise unattached to the sheets. In this embodiment the width of the auxiliary strip and the width of the pattern defined by the filamentary element may both be less than the spacing between adjacent rows of sound-transmitting apertures in the sheets, the butt joint between sheets being effected midway between such rows, so that the sound transmitting characteristics of the screen will be unimpaired and uniform over its entire area.

To the accomplishment of the above, and to such other objects as may hereinafter appear, my invention relates to the structure of a motion picture projection screen formed from joined sheets as defined in the appended claims and as described in this specification, taken together with the accompanying drawings, in which:

Fig. 1 is a top view of two sheets in a position preliminary to being joined in accordance with the present invention;

Fig. 2 is an end view of two such sheets showing one means by which pressure may be applied thereto;

Fig. 3 is a cross sectional view, taken along the line 3—3 of Fig. 4, of the sheets of Figs. 1 and 2 after joining;

Fig. 4 is a top plan view of the joined sheets of Fig. 3;

Figs. 5 and 6 are views similar to Fig. 4 but showing specifically different configurations for the filamentary elements;

Fig. 7 is a view similar to Fig. 3 but showing an alternative embodiment in which the zig-zag filamentary element has the arms of the zig-zag inclined downwardly from the center thereof;

Fig. 8 is a view similar to Fig. 4 but showing the use of a filamentary element formed from a plurality of individual filaments braided or twisted together;

Fig. 9 is a cross sectional view taken along the line 9—9 of Fig. 8;

Figure 10:
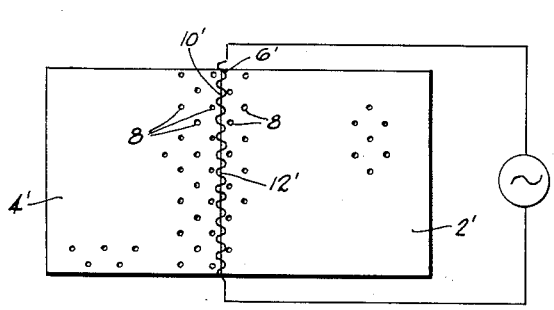
Fig. 10 is a view similar to Fig. 1 but showing the first step in producing an alternative embodiment.

The projection screen of the instant invention is here specifically disclosed as formed of a pair of plastic sheets 2 and 4, but obviously the screen could, and is actual practice, would, be formed of more than two sheets joined together. Since the joining of additional sheets would merely duplicate the joining of the sheets 2 and 4, it is not deemed necessary to specifically disclose any number of joined sheets greater than two. The sheets 2 and 4 may be formed of any suitable heat-softenable material. Many substances are used for this purpose, among which may be mentioned, by way of example only and not by way of limitation, cellulose acetate, Lucite and vinyl resins, particularly polymers of vinyl chloride, vinylidene chloride, vinyl acetate, and copolymers thereof. These sheets may be of any of the four types mentioned above, to wit, those which will form matte white screen, plain metallic screens, beaded screens or lenticular screens. The light reflective surfaces thereof, which will vary in composition and shape in accordance with the type of screen desired, are not shown in the drawings, all of the top plan views in the drawings being taken from the non-reflective surfaces of the sheets because it is to those surfaces that the filamentary element generally designated 6 is applied. The sheets 2 and 4 are provided with a plurality of apertures 8, as it conventional, so as to permit the passage of sound therethrough from the sound projector normally located to the rear of the screen out to the audience located in front of the screen. These apertures are commonly present about 40–50 per square inch, in rows spaced from one another by approximately 3/32 inch.

In the embodiment shown in Figs. 1–9 the sheets 2 and 4 are positioned with their opposing edges 10 and 12 respectively in abutting relation. The filamentary element 6, in the form shown in Figs. 1–7, is formed of a metallic wire bent into zig-zag form so as to extend generally longitudinally along the sheet edges 10 and 12 and so as to have arms 14 and 16 extending laterally in opposite directions so as to overlie the sheets 2 and 4 respectively. The filamentary element 6 will therefore be seen to extend from one sheet 2 or 4 to the other across or between the sheet edges 10 and 12 respectively.

In order to form the joint heat is applied to the sheets 2 and 4 so as to soften those sheet portions lying beneath the element 6, and pressure is applied to the element 6 so as to force it into the softened sheet portions, the element 6 thus becoming embedded within the sheets 2 and 4. When the sheets 2 and 4 have cooled, the element 6 which is embedded therein will serve to fasten the two sheets together with a joint which has a strength determined by the tensile strength of the element 6 itself, the degree to which the element 6 has been secured to the sheets 2 and 4, and the number of times that the element 6 crosses the sheet edges 10 and 14. Had pressure alone been applied to the element 6 to force it into the sheets 2 and 4, the joint thus formed would have been exceedingly weak. However, I have found that by causing the surfaces of the object with which the wire is in contact to melt and then to resolidify around the wire, a joint of great strength is produced.

Figs. 1, 2 and 3 illustrate one way in which the joint in question may be formed. The ends of the element 6, which is constituted by a continuous zig-zag shaped wire, are electrically connected to a suitable source of current 18, here shown as alternating in nature but which might equally as well produce direct current. It has been found that Nichrome, steel, or any other commercial resistance wire may be used for this purpose, since they all have appreciable tensile strength and appropriate resistance characteristics.

The size of the wire, its length, its resistance characteristics, and the width of its zig-zag shape may all be varied within wide limits depending upon the particular application in which it is used, the thickness of the sheets 2 and 4, the strength desired in the joint, the flexibility desired in the joint, and the temperature to which the surfaces with which it is in contact must be raised in order to be softened. I have found that in the employment of this method to join thermoplastic sheets of a thickness of about .01 or .020 inch, the diameter of wire is preferably approximately one-half of the thickness of the sheets. With sheets of approximately 20 mils thickness, the diameter of the element 6 should be within the range of 7–12 mils. The width of the zig-zag shape should be approximately one-quarter of an inch and there should be approximately 5 to 8 zig-zags or 10 to 16 cross wires per inch of abutting joint.

As the current is passed through the wire 6, the temperature of the wire will rise, and, as has already been explained, this will cause the temperature of the surfaces with which it is in contact to rise until those surfaces have melted or softened. A pressure head 20 (see Fig. 2) is then applied to the wire 6 so as to urge it into the softened or melted surfaces of the sheets 2 and 4 until the wire 6 is embedded therein. The pressure applied is not sufficient to deform or plastically distort the sheets 2 and 4 but is only sufficient to urge the wire 6 thereinto after the surfaces with which the wire is in contact have been heat-softened.

I have found it sufficient in many applications, and particularly in those in which the diameter of the wire and the thickness of the sheets are in the specific proportions set forth above, to embed the wire C fully into the sheets 2 and 4 and to have the plastic flow back over the wire.

It has been found that when working with sheets 2 and 4 approximately 22 mils in thickness and with wires 6 of approximately 10 mils in thickness, current need be applied to the wire 6 only for a very short period of time on the order of between ¾ and 1½ seconds. The timing is affected by the size of the wire, the depth to which it is desired that the wire penetrate, and by the nature of the sheets 2 and 4 themselves. It might particularly be mentioned that if the sheets 2 and 4 are pigmented a somewhat longer time of current application is required, since the pigment apparently adds body to the material of which the sheets 2 and 4 are formed and therefore resists the movement of the wire 6 into the sheets. The time interval may, of course, be controlled by the employment of mechanical timing apparatus, but in one embodiment of my method, the wire 6 itself may act as the heat control element. To this end, a portion 19 of that part of the wire 6 which projects beyond the sheets 2 and 4 may be narrowed or constricted to such a degree that when the wire has attained the desired temperature for the desired period of time, the narrowed part 19 thereof will melt and thus break the electrical circuit and prevent further heating of the wire. It is, of course, not necessary that the portion 19 be narrowed, if the particular application and the particular wire are such that the wire at its normal diameter when exposed to the atmosphere will provide the desired fuse action.

The amount of pressure applied to the wire 6 is quite minimal. A force of eight to ten pounds per lineal inch of the edges 10 and 12 is quite satisfactory. It must be borne in mind that particularly when beaded or lenticular screens are involved the pressure must not be so great as to distort the lower or light reflective surfaces of the sheets.

The surface of the pressure head 20 which engages the wire 6 may be of any suitable dielectric material, such as glass, and is preferably smooth. When glass is employed, it has been found that, without having to take any special steps, the wire 6 may be completely embedded within the sheets 2 and 4 and some of the heat-softenable material of which those sheets are formed will flow back over the upper surface of the wire 6, as previously mentioned and as clearly shown in Fig. 3 in somewhat exaggerated form, thus appreciably adding to the security of attachment of the wire 6 to the sheets 2 and 4, that security of attachment playing a large part in producing a joint of appropriate strength. It is probably for this reason that it has been found that complete embedment of the wire 6 within the sheets 2 and 4 produces the most effective joint.

However, in a projection screen the light reflective surfaces must be unaffected. It is for this reason that best results are obtained when the thickness of the wire 6 is substantially half the thickness of the sheets 2 and 4. To the extent that the wire thickness is less, the strength of the joint suffers. To the extent that the wire thickness is greater, the susceptibility of the light reflective surfaces of the sheets to distortion increases.

It has also been found, particularly when the sheets 2 and 4 are comparatively thin, that an excessive concentration of heat in any one area of a given sheet might cause a "burning" thereof, or at least a discoloration of the reflective surface thereof. Accordingly the wire 6 is so shaped as to provide for a comparatively uniform distribution of heat, and to that end the tips of the arms 14 and 16 of the zig-zag are preferably blunt and smoothly curved rather than pointed or sharply angled. In order to further reduce the tendency of the sheets toward burning or discoloration, the bed on which the sheets are supported when the wire 6 is pressed thereinto, or the pressure head 20 itself, or both, may be cooled in any appropriate manner.

While in Fig. 1 the heat which softens the sheets 2 and 4 is produced by passing a current through the wire 6, it will be understood that that heat will be produced in many different ways. For example, the wire 6 could be subjected to induction heating, or the sheets 2 and 4 could be subjected to dielectric heating, preferably localized.

Figs. 4, 5 and 6 show three different configurations which the wire 6 may take when bent into zig-zag form. All of these are characterized by the fact that the wire is uniformly spaced with respect to the surfaces and bodies of the sheets 2 and 4, and the presence of points or angles is avoided, all to the end that the distribution of heat in the sheets 2 and 4 while the wire 6 is being embedded is substantially uniform along the length of the wire 6, is sufficient to permit ready embedment of the wire 6, and is such that burning or discoloration of the sheets 2 or 4 is avoided.

Fig. 7 discloses an alternative configuration of the wire 6 in which the arms 14 and 16 of the zig-zag configuration are inclined downwardly with respect to those portions 22 of the wire 6 midway between the tips of the arms 14 and 16, the portions 22 in effect defining a line extending parallel to the edges 10 and 12 of the sheets 2 and 4 and constituting, in a manner of speaking, the longitudinal axis of the zig-zag wire 6. With the wire configuration shown in Fig. 7 the pressure head 20 will engage the wire 6 at the portions 22, and consequently the tips of the arms 14 and 16 will be more deeply embedded in the sheets 2 and 4 than would otherwise be the case, thus giving rise to an increase in the strength of the joint produced thereby.

The strength of the joint can also be increased by using, as the filamentary element 6, a wire or the like formed of at least two individual wires or filaments 6a and 6b twisted or braided together (see Figs. 8 and 9), the diameter of each of the individual filaments 6a and 6b being an appropriate fraction of the overall thickness desired in the filamentary element 6. For example, with sheets 2 and 4 having a thickness of approximately 22 mils, the thickness of each of the individual filaments 6a and 6b should be between 3½ and 6 mils. When a twisted or braided filamentary element 6 is employed, it is retained within the sheets 2 and 4 after embedment in a somewhat more reliable manner than when the element 6 is formed of a single filament, probably because the softened material of which the sheets 2 and 4 are formed flows around, and perhaps even between, the individual filaments. When the material hardens it will firmly grip the individual filaments 6a and 6b and strongly resist any separation of them from the sheets 2 and 4.

It has been found that with vinyl resin sheets for lenticular type screens, which sheets have a thickness of approximately 22 mils, and when a wire 6 having a diameter of approximately 10 mils is completely embedded therein, that wire being formed into zig-zag shape with ten to sixteen crossings of the sheet edges 10 and 12 per linear inch of those edges, the joint thus formed is able to withstand a pull-apart force of between forty and sixty pounds per inch, and in some cases even eighty pounds per inch, without any visible spreading of the edges 10 and 12. Moreover, no bulging whatsoever is apparent at the joined edges, nor are the light reflective surfaces of the sheets 2 and 4 in any way distorted. It will be appreciated that the pull-apart forces involved are appreciably greater than those which will be experienced when the sheets are employed as a projection screen. Hence the advantageousness of the joint of the present invention from an operational point of view is seen to be quite great. Moreover, the ease with which the joint can be made and the inexpensiveness of the materials and apparatus employed make the structure of the present invention a marked step forward in the motion picture projection screen field.

In the previously described embodiment the width of the zig-zag pattern defined by the filamentary element 6 may be greater than the spacing between the rows of sound-transmitting apertures 8. Thus the uniformity of spacing of those perforations 8 over the surface of the composite screen may be destroyed. Moreover, if the filamentary element 6 passes over any of those apertures 8 (and it is usually difficult from a practical point of view to prevent that from happening) the strength of the joint is to that extent reduced, since portions of the filamentary element 6 will not be embedded in anything, and the sound-transmissive properties of some of the apertures 8 will be reduced.

In order to avoid these disadvantages and to produce a completely uniform composite screen, the embodiment of Figs. 10–15 has been devised. There the width of the zig-zag pattern of the filamentary element 6 is made sufficiently small so as not to cross any of the sound-transmitting apertures 8. Ordinarily a zig-zag pattern of this width would not provide sufficient seam strength. Accordingly, the filamentary element 6 is only partially embedded into the joined sheets, and an auxiliary strip 22 is employed, into which that portion of the filamentary element 6 extending above the joined sheets is embedded, the auxiliary strip 22 being otherwise unsecured to the joined sheets and having a width corresponding to that of the zig-zag pattern of the filamentary element 6. It has been found that this arrangement provides a joint strength comparable to that of the first described embodiment but utilizing joining elements the width of which is such as not to interfere with any of the sound-transmitting perforations 8.

Figure 11:
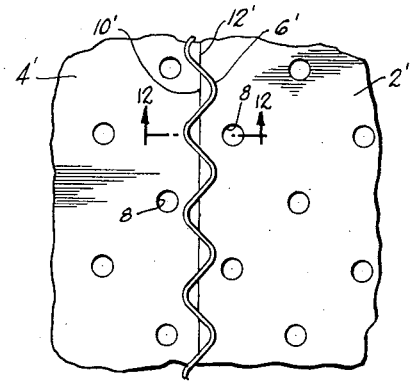
Fig. 11 is a top plan view on an enlarged scale of the sheets of Fig. 10 after the filamentary element has been partially embedded therein.

As may be seen from Figs. 10 and 11, in this embodiment the sheets 2' and 4' are cut so that their opposing edges 10' and 12' respectively are spaced from the last row of sound-transmitting apertures 8 by a distance equal to one-half the normal spacing between such rows. As a result, when the sheet edges 10' and 12' are butted against one another the adjacent rows of apertures 8 on the sheets 2' and 4' respectively are spaced from one another by the same distance as all the other rows of apertures 8 throughout the surface of the screen. In one commercial screen the lateral spacing between the centers of the holes of adjacent rows is approximately 3/32 inch and the lateral spacing between the peripheries of the holes is approximately 1/16 inch.

The filamentary element 6' corresponds to the filamentary element 6 of the previously described embodiment except that the width of its zig-zag pattern is approximately 1/16 inch, so that the filamentary element 6', when placed across the abutting sheet edges 10' and 12', is substantially completely positioned inside the adjacent rows of sound-transmitting apertures 8 on the sheets 2' and 4' respectively. This positioning may readily be accomplished by initially securing the filamentary element 6 with a transparent glass strip, placing the glass strip with the filamentary element 6 attached over the joint and aligning them to produce the desired location of the filamentary element 6, and then applying pressure to the top of the glass strip while current is passed through the filamentary element 6, after which the glass strip is removed from the screen. Hence substantially the entire length of the filamentary element 6' will be embedded in the sheets 2' and 4', and without obstructing or crossing any of the sound-transmitting apertures 8.

Figure 12:
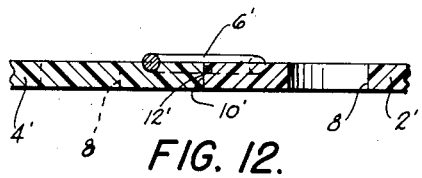
Fig. 12 is a cross sectional view taken along the line 12—12 of Fig. 11.
Figure 13:
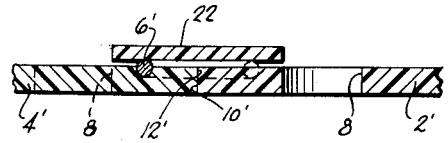
Fig. 13 is a cross sectional view similar to Fig. 12 but showing the auxiliary strip in inital position.
Figure 14:
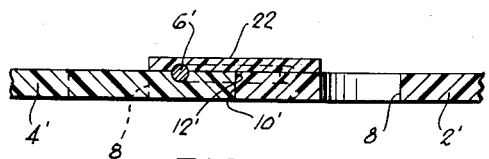
Fig. 14 is a cross sectional view similar to Fig. 13 but showing the auxiliary strip in final position wth part of the filamentary element embedded therein.
Figure 15:
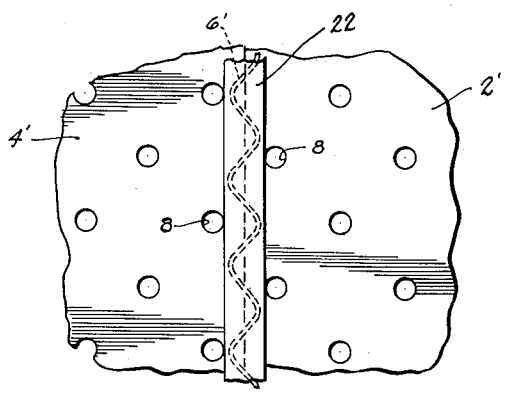
Fig. 15 is a top plan view of the finished joint of Fig. 14.

As may best be seen from Fig. 12, the filamentary element 6' is only partially embedded in the sheets 2' and 4' and preferably to an extent equivalent to approximately 2/3 to 3/4 of the total thickness of the filamentary element 6. Thereafter as may be seen from Fig. 13, an auxiliary strip 22 is placed atop the filamentary element 6'. This auxiliary strip 22 is, like the sheets 2' and 4', of a heat-softenable material which may be the same as the material of the sheets 2' and 4' or different therefrom but compatible therewith. The width of the auxiliary strip 22 is equal to or less than the lateral distance between the peripheries of the adjacent rows of apertures 8 on the sheets 2' and 4'. Thereafter current is again passed through the filamentary element 6' and the auxiliary strip 22 is pressed down thereupon, as a result of which that portion of the filamentary element 6 which extends above the sheets 2' and 4' becomes embedded in the auxiliary strip 22, as may clearly be seen from Fig. 14. In the course of this operation some further embedment of the filamentary element 6' into the sheets 2' and 4' may occur, but this can be compensated for by initially embedding the filamentary element 6 in the sheets 2' and 4' to a somewhat lesser extent than desired in the final product.

It has already been pointed out that the filamentary element 6' does not interfere with or obstruct any of the sound-transmitting apertures 8. As may clearly be seen from Figs. 14 and 15, the auxiliary strip 22 may be similarly characterized.

Through the use of the auxiliary strip 22 a joint of adequate strength is produced even though the width of the zig-zag pattern of the filamentary element 6' is considerably smaller than that of the first described embodiment. Moreover, with this particular type of joint it has been found that the presence of the auxiliary strip 22 does not cause the undesirable bulging of the screen along the joint line which is characteristic of the sealing strips previously used in the prior art. The reason for this perhaps unexpected but nonetheless extremely welcome attribute is not clear, but it is believed to arise largely because of the fact that the auxiliary strip 22, in contradistinction to the sealing strip of the prior art, is not secured to the sheets 2' and 4' over its entire surface, but is secured thereto only by virtue of the filamentary element 6. Hence the auxiliary strip 22 is not an integral part of the screen through which the line of stress can travel. Another contributing factor may be the extreme narrowness of the auxiliary strip 22. It would be utterly impractical to utilize a sealing strip in accordance with the teachings of the prior art which had a comparable width, since the joint produced by such a prior art sealing strip would be far too weak for all practical purposes. In addition, the auxiliary strip 22, again in contradistinction to the sealing strips of the prior art, does not in any way interfere with or obstruct the sound-transmitting apertures 8.

The embodiment of Figs. 10–15 is particularly well adapted for use on large size screens, whereas the embodiment of Figs. 1-9 is particularly well adapted for use on small screens, particularly those adapted for home or portable use which are mounted on rollers.

This application is a continuous in part of my copending application of similar title, Serial No. 515,811, filed June 16, 1955, now abandoned.

While but a limited number of embodiments of the present invention have been here disclosed, it will be apparent that many variations may be made therein, all within the spirit of the invention as defined in the following claims.

I claim:

1. A motion picture projection screen comprising a pair of light-reflective sheets of heat-softenable material arranged substantially in line with one another with opposing edges thereof closely adjacent one another and having substantially aligned faces, and a fialmentary element of comparatively high tensile strength embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets and extending continuously in zig-zag manner from one sheet to the other, said element serving to retain said sheets in arranged position, said sheets having a thickness on the order of .02 inch, and having soft and readily pressure-deformed lenticular protrusions on the faces thereof opposite said faces in which said element is embedded.

2. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets and extending continuously in zig-zag manner from one sheet to the other so as to make at least ten crossings from sheet to sheet per linear inch of said edges, said element serving to retain said sheets in arranged position, said sheets having a thickness on the order of .02 inch, and having soft and readily pressure-deformed lenticular protrusions on the faces thereof opposite said faces in which said element is embedded.

3. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength embedded in said faces of said sheets, said sheets being hardened therearound to thereby secure said element to said sheets, said hardened sheet portions constituting substantially the sole means securing said element to said sheets, said element extending from one sheet to the other between said edges, said element extending continuously in zig-zag manner from one sheet to the other, said element serving to retain said sheets in arranged position, said sheets having a thickness on the order of .02 inch, and having soft and readily pressure-deformed lenticular protrusions on the faces thereof opposite said faces in which said element is embedded.

4. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength embedded in said faces of said sheets, said sheets being hardened therearound to thereby secure said element to said sheets, said hardened sheet portions constituting substantially the sole means securing said element to said sheets, said element extending from one sheet to the other between said edges, said element extending continuously in zig-zag manner from one sheet to the other so as to make at least ten crossings from sheet to sheet per linear inch of said edge, said element serving to retain said sheets in arranged position, said sheets having a thickness on the order of .02 inch, and having soft and readily pressure-deformed lenticular protrusions on the faces thereof opposite said faces in which said element is embedded.

5. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets, said element serving to retain said sheets in arranged position, said sheets having a thickness on the order of .02 inch, and having soft and readily pressure-deformed lenticular protrusions on the faces thereof opposite said faces in which said element is embedded.

6. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets and extending continuously in zig-zag manner from one sheet to the other, said element serving to retain said sheets in arranged position, said sheets having a thickness on the order of .02 inch, and having soft and readily pressure-deformed lenticular protrusions on the faces thereof opposite said faces in which said element is embedded.

7. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets and extending continuously in zig-zag manner from one sheet to the other so as to make at least ten crossings from sheet to sheet per linear inch of said edges, said element serving to retain said sheets in arranged position, said sheets having a thickness on the order of .02 inch, and having soft and readily pressure-deformed lenticular protrusions on the faces thereof opposite said faces in which said element is embedded.

8. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element extending continuously in zig-zag manner from one sheet to the other, said element serving to retain said sheets in arranged position, said sheets having a thickness on the order of .02 inch, and having soft and readily pressure-deformed lenticular protrusions on the faces thereof opposite said faces in which said element is embedded.

9. A motion picture projection screen comprising a pair of light-reflective sheets of heat-softenable material arranged substantially in line with one another with opposing edges thereof closely adjacent one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element extending continuously in zig-zag manner from one sheet to the other so as to make at least ten crossings from sheet to sheet per linear inch of said edges, said element serving to retain said sheets in arranged position, said sheets having a thickness on the order of .02 inch, and having soft and readily pressure-deformed lenticular protrusions on the faces thereof opposite said faces in which said element is embedded.

10. A motion picture projection screen comprising a pair of light-reflective sheets of heat-softenable material arranged with opposing edges thereof abutting one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets and extending continuously in zig-zag manner from one sheet to the other, said element serving to retain said sheets in arranged position, said sheets having a thickness on the order of .02 inch, and having soft and readily pressure-deformed lenticular protrusions on the faces thereof opposite said faces in which said element is embedded.

11. A motion picture projection screen comprising a pair of light-reflective sheets of heat-softenable material arranged with opposing edges thereof abutting one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element having a thickness approximately half the thickness of said sheets and extending continuously in zig-zag manner from one sheet to the other so as to make at least ten crossings from sheet to sheet per linear inch of said edges, said element serving to retain said sheets in arranged position, said sheets having a thickness on the order of .02 inch, and having soft and readily pressure-deformed lenticular protrusions on the faces thereof opposite said faces in which said element is embedded.

12. A motion picture projection screen comprising a pair of light-reflective sheets of heat-softenable material arranged with opposing edges thereof abutting one another and having substantially aligned faces, and a filamentary element of comparatively high tensile strength substantially fully embedded in said faces of said sheets, said sheets being hardened therearound to thereby secure said element to said sheets, said hardened sheet portions constituting substantially the sole means securing said element to said sheets, said element extending from one sheet to the other between said edges, said element extending continuously in zig-zag manner from one sheet to the other so as to make at least ten crossings from sheet to sheet per linear inch of said edges, said element serving to retain said sheets in arranged position, said sheets having a thickness on the order of .02 inch, and having soft and readily pressure-deformed lenticular protrusions on the faces thereof opopsite said faces in which said element is embedded.

13. The motion picture projection screen of claim 2, in which said filamentary element comprises a plurality of individual elements twisted together.

14. The motion picture projection screen of claim 2, in which said filamentary element comprises a conductive wire of appreciable electrical resistance.

15. The motion picture projection screen of claim 2, in which said filamentary element comprises a plurality of individual filaments twisted together, each of said individual filaments comprising a conductive wire of appreciable electrical resistance.

16. The motion picture projection screen of claim 2, in which the tips of the zig-zag portions of said filamentary elements are inclined downwardly into the bodies of said sheets.

17. The motion picture projection screen of claim 2, in which the tips of the zig-zag portions of said filamentary elements are inclined downwardly into the bodies of said sheets, said filamentary elements comprising conductive wire of appreciable electrical resistance.

18. A motion picture projection screen comprising a pair of light-reflective sheets of heat softenable material arranged substantially in line with one another with opposing edges thereof closely adjacent one another and having substantially aligned faces, and a filamentary element of comparatively high tensile strength only partially embedded in said faces of said sheets, said sheets being hardened therearound to thereby secure said element to said sheets, said element extending from one sheet to the other between said edges, said element having a thickness approximately half the thickness of said sheets, and an auxiliary strip extending over said sheets and said filamentary element, said filamentary element being partially embedded in said strip, said strip being hardened therearound to thereby secure said element to said strip.

19. The screen of claim 18, in which said sheets are provided with sound-transmitting apertures distributed over the surface thereof, said opposing edges of said sheets being located between said apertures and the widths of said auxiliary strip and of the pattern defined by said element being less than the lateral spacing between adjacent apertures in said respective sheets.

20. A motion picture projection screen comprising a pair of light-reflective sheets of heat softenable material arranged substantially in line with one another with opposing edges thereof closely adjacent one another and having substantially aligned faces, and a filamentary element of comparatively high tensile strength only partially embedded in said faces of said sheets, said sheets being hardened therearound to thereby secure said element to said sheets, said element extending from one sheet to the other between said edges, said element having a thickness approximately half the thickness of said sheets, and an auxiliary strip extending over said sheets and said filamentary element, said filamentary element being partially embedded in said strip, said strip being hardened therearound to thereby secure said element to said strip, said element constituting substantially the sole means securing said strip to said sheets.

21. The screen of claim 20, in which said sheets are provided with sound-transmitting apertures distributed over the surface thereof, said opposing edges of said sheets being located between said apertures and the widths of said auxiliary strip and of the pattern defined by said element being less than the lateral spacing between adjacent apertures in said respective sheets.

References Cited in the file of this patent

UNITED STATES PATENTS

| | | |
|---|---|---|
| 1,856,739 | Alt et al. | May 3, 1932 |
| 2,367,725 | Lindh et al. | Jan. 23, 1945 |
| 2,378,801 | Sidell et al. | June 19, 1945 |
| 2,391,731 | Miller et al. | Dec. 25, 1945 |
| 2,739,829 | Pedlow et al. | Mar. 27, 1956 |
| 2,742,390 | Beck | Apr. 17, 1956 |